US008603291B2

(12) United States Patent
Tsai et al.

(10) Patent No.: US 8,603,291 B2
(45) Date of Patent: Dec. 10, 2013

(54) POLARIZER PLATE AND PREPARATION METHOD THEREOF

(75) Inventors: Cheng-Hsin Tsai, Taoyuan County (TW); Shu-Yi Chang, Taoyuan County (TW); Tsung-Han Lee, Taipei (TW)

(73) Assignee: BenQ Materials Corporation, Taoyuan County (TW)

( * ) Notice: Subject to any disclaimer, the term of this patent is extended or adjusted under 35 U.S.C. 154(b) by 130 days.

(21) Appl. No.: 13/082,398

(22) Filed: Apr. 8, 2011

(65) Prior Publication Data

US 2012/0141813 A1 Jun. 7, 2012

(30) Foreign Application Priority Data

Dec. 7, 2010 (TW) ................................ 99142640 A

(51) Int. Cl.
*B32B 27/30* (2006.01)
*B29C 47/00* (2006.01)
*G02B 5/30* (2006.01)
*B32B 37/16* (2006.01)

(52) U.S. Cl.
USPC ...... 156/328; 156/242; 156/244.11; 156/277; 156/289; 428/520; 428/522

(58) Field of Classification Search
USPC ............ 156/325, 242, 244.11, 277, 289, 328; 428/520, 522
See application file for complete search history.

(56) References Cited

U.S. PATENT DOCUMENTS

| 6,961,178 | B2* | 11/2005 | Sugino et al. ............. 359/485.03 |
| 7,008,504 | B2 | 3/2006 | Tsuchimoto et al. |
| 2009/0202822 | A1 | 8/2009 | Hasegawa et al. |
| 2010/0253884 | A1 | 10/2010 | Katou et al. |

FOREIGN PATENT DOCUMENTS

| JP | 2002-303727 | | 10/2002 |
| TW | 200730940 | | 8/2007 |
| TW | 200837402 | A | 9/2008 |
| TW | I307422 | | 3/2009 |
| TW | 201015117 | A | 4/2010 |

* cited by examiner

*Primary Examiner* — Michael N Orlando
*Assistant Examiner* — Daniel Lee
(74) *Attorney, Agent, or Firm* — CKC & Partners Co., Ltd.

(57) ABSTRACT

Acrylic resin is used as a protection film of a polyvinyl alcohol polarizer film to compose a polarizer plate, wherein the glass transition temperature of the acrylic resin is higher than 50° C. A preparation method of the polarizer plate is also disclosed.

7 Claims, 1 Drawing Sheet

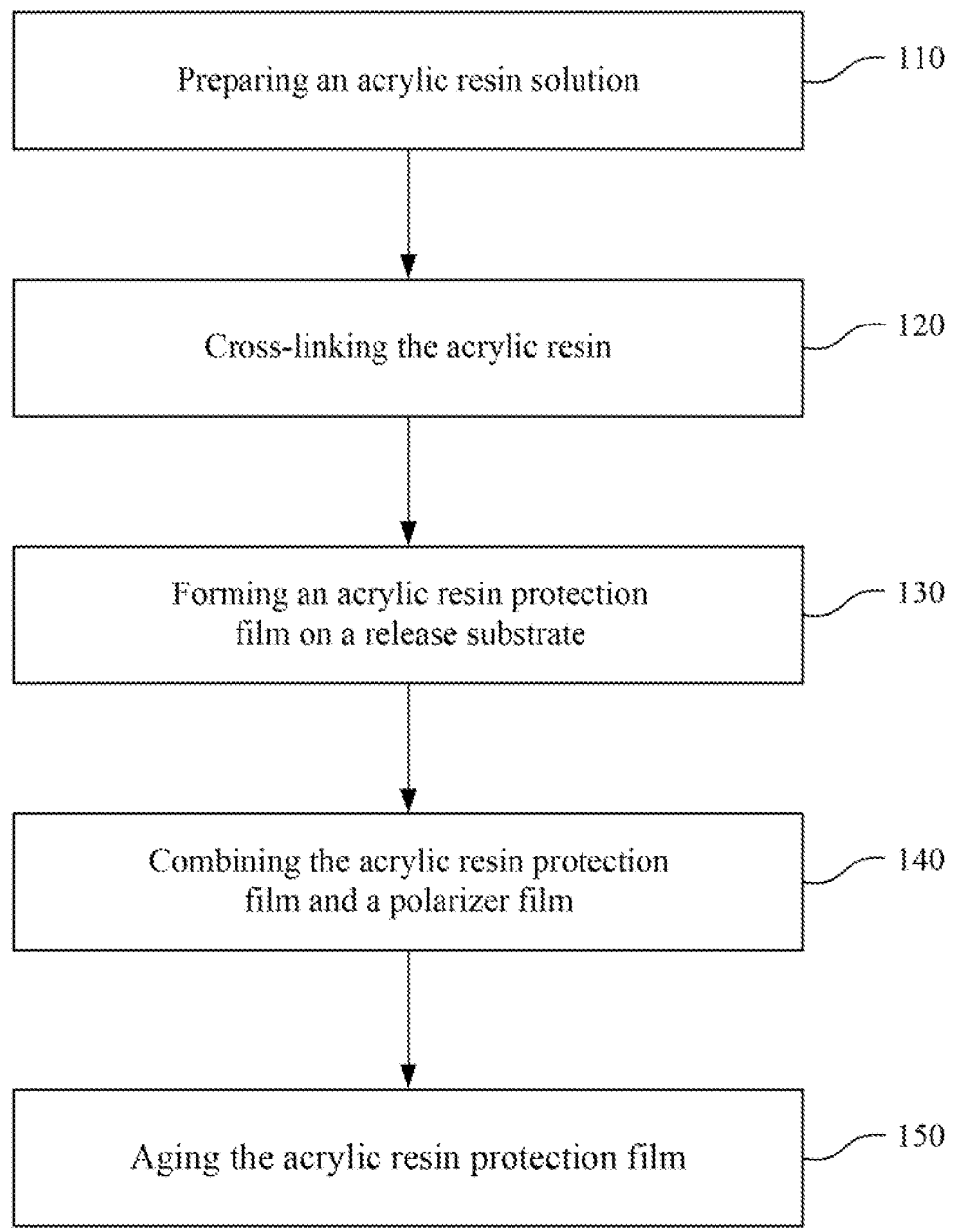

POLARIZER PLATE AND PREPARATION METHOD THEREOF

CROSS-REFERENCE TO RELATED APPLICATION

This application claims the priority benefit of Taiwan application serial no 099142640, filed Dec. 7, 2010, the full disclosure of which is incorporated herein by reference.

BACKGROUND

1. Technical Field

The disclosure relates to an optical element and a preparation method thereof. More particularly, the disclosure relates to a polarizer plate and a preparation method thereof.

2. Description of Related Art

One of the components of liquid crystal displays (LCD) is the polarizer plate. The cost of the polarizer plate is about 6%-18% of the total cost of LCDs. The polarizer film of the polarizer plate commonly is the stretched polyvinyl alcohol (PVA) film. Since optical properties of the stretched PVA film are easily affected by heat and moisture, additional two protection films are needed to sandwich the PVA film to protect the stretched PVA from damage.

In the present, the most usual materials for the protection films is triacetate cellulose (TAC) or cycloolefin polymer (COP), both are quite expensive. Moreover, the hydrogel is needed to adhere the protection films to the PVA film. In order to increase the adhesive strength between the PVA film and the protection films, additional treatment to the protection film is needed, such as the TAC films need strong base etching treatment and the COP films need corona treatment. The preparation process of the polarizer plate is quite complicated. Therefore, an object of the present invention is providing a novel polarizer plate in which the protection film is replaced by the acrylic resin protection film. And an object of the present invention is providing a novel polarizer preparation method in which the acrylic resin protection film can be also used as an adhesive without using the hydrogel to adhere to the PVA film. In the preparing method of the novel polarizer, a glass transition temperature of the acrylic resin is preferred higher than 50° C. to avoid the acrylic resin soften at the room temperature and provide the sufficient protection. Moreover, the glass transition temperature of the acrylic resin is preferred not more than 100° C. When the acrylic resin have a higher glass transition temperature the is, acrylic resin protection film must be laminated at higher temperature and there maybe a possibility of exerting a damage by heating on the polarizer.

SUMMARY

Accordingly, the present invention is directed to a novel polarizer plate and a novel preparation method thereof.

In one aspect, a method of preparing a polarizer plate is provided. The method comprises the steps of preparing an acrylic resin solution having a solid content of 20 wt %-50 wt %, wherein a glass transition temperature of the acrylic resin is higher than 50° C. and coating the acrylic resin solutions to form the acrylic resin protection film on a release substrate. The acrylic resin protection film, a polarizer film, and a second protection film are laminated to form a polarizer plate, wherein the polarizer film is between the acrylic resin protection film and the second protection film.

According to an embodiment, across-linking agent can be further added into the acrylic resin solution to cross-link the acrylic resin.

According to another embodiment, the acrylic resin protection film is formed by coating, extruding, casting, or screen printing on a release substrate.

According to yet another embodiment, a method of laminating the acrylic resin protection film a polarizer film, and a second protection film is to thermolaminating.

According to yet another embodiment, the polarizer plate further stands at 20° C.-60° C. to increase the glass transition temperature of the acrylic resin protection film.

According to yet another embodiment, the polarizer film comprises a stretched polyvinyl alcohol film.

According to yet another embodiment, a method of preparing a polarizer plate is laminating an acrylic resin protection film and a polyvinyl alcohol polarizer film, wherein the glass transition temperature of the acrylic resin protection film is higher than 50° C.

According to yet another embodiment, the acrylic resin protection film and the second protection film are the same or different.

According to yet another embodiment, the second protection film is selected from the group consisting of acrylic resin, triacetate cellulose, cycloolefin polymer, poly(methyl methacrylate), and polyethylene terephthalate.

According to yet another embodiment, the acrylic resin protection film is select from the group consisting of methyl methacrylate, methacrylic acid, acrylic acid, 2-hydroxyethyl methacrylate and a combination thereof.

In light of the forgoing, the acrylic resin is used as a protection film. Moreover, the acrylic resin can be used as a protection film to provide sufficient protection to the polarizer by thermolaminating to omit the conventional step of coating the hydrogel. Therefore, applying the method above to prepare a polarizer plate can save cost and simplify the preparation process.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1 is a process flow diagram of preparing a polarizer plate according to one embodiment of this invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Preparation Method of a Polarizer Plate

FIG. 1 is a process flow chart of preparing a polarizer plate according to one embodiment of this invention. In step 110 of FIG. 1, an acrylic resin solution is prepared. The molecular weight of the acrylic resin can be 200,000 to 2,000,000, preferably from 300,000 to 800,000 and more preferably from 400,000 to 600,000. The solid content of the acrylic resin solution is controlled to facilitate the coating process of the acrylic resin solution. In order to form an acrylic resin protection film, the solid content of the acrylic resin solution may be 20 wt % to 50 wt %. The solvent of the acrylic resin solution is an organic solvent, such as an ester, a ketone, or an alcohol. The organic solvent can be ethyl acetate, butyl, acetate, methyl ethyl ketone and isopropanol.

For the application of polarizer in display devices, it is suggested that the glass transition temperature of the acrylic resin film is from the range of 50° C. to 100° C. Therefore, monomers of the acrylic resin are selected from the monomers having high glass transition temperature (simplified as "high Tg monomers" below). The high Tg monomers can be selected from the group consisting of methyl methacrylate (MMA), methacrylic acid (MAA), acrylic acid (AA), 2-hydroxyethyl methacrylate (2-HEMA) and a combination thereof.

Except for the high Tg monomers above, the acrylic resin can choose other acrylic acid monomers (simplified as "other monomers" below) to meet requirements for other properties of the acrylic resin protection film, such as optical properties and adhesive properties. Common other monomers can be methyl acrylate (MA), benzyl methacrylate, butyl methacrylate, cyclohexyl methacrylate, N,N-dimethylamino ethyl methacrylate, ethyl methacrylate, glycidyl methacrylate, isobornyl methacrylate, methyl acrylate, and/or phenyl methacrylate.

In order to enable the glass transition temperature of the acrylic resin containing high Tg monomers and other monomers to be in the range mentioned above, it can be calculated by Fox Equation (1) as follow:

$$1/Tg = \Sigma W_i/Tg_i \quad (1)$$

In Fox Equation (1), Tg is a glass transition temperature of an acrylic resin containing at least two kinds of monomers, $Tg_i$ is the glass transition temperature of the $i^{th}$ monomer of the acrylic resin, and Wi is the weight ratio of the $i^{th}$ monomer of the acrylic resin. Therefore, suitable monomers can be chosen to adjust the glass transition temperature of an acrylic resin according to the Fox Equation.

Next, cross-linking step 120 can be performed to cross-link the acrylic resin in the solution. Therefore, cross-linking agents can be added into the acrylic resin solution to cross-link the acrylic resin. A catalyst can be further added into the acrylic resin solution to catalyze the cross-linking reaction. For example, if the acrylic resin containing monomers having hydroxyl (—OH) functional group, such as 2-hydroxyethyl acrylate, the cross-linking agent can be an isocyanate with —NCO functional group, and the catalyst can be an acid to catalyze the cross-linking reaction.

For example, common isocyanate cross-linking agents can be toluene diisocyanate (TDI), xylylene diisocyanate (XDI), hexamethylene diisocyanate (HDI), methylene diphenyl diisocyanate (MDI), and isophorone diisocyanate (IPDI). Furthermore, the above isocyanate can be used in a form of an adduct formed by reacting with other compounds or blocked by other blocked agents. The adduct mentioned above can be for example, such an adduct formed by reacting the isocyanate with trimethylolpropane (TMP), or an acrylic trimer formed by polymerizing three isocyanates to result in an isocyanurate. The blocked agent mentioned above can be methylethylketoxime (MEKO), diethyl malonate (DEM), 3,5-dimethylpyrazole (DMP), or caprolactam.

The acid catalyst above can be such as complex ions of $Al^{3+}$, $Zr^{4+}$, $Zn^{2+}$, or $Bi^{3+}$. Common ligands of these complex ions can be acetylacetonate, 2-ethylhexanoate, isopropoxide, and/or stearate.

In step 130, the acrylic resin solution forms an acrylic resin protection, film on a release substrate. The release substrate can be polyethylene terephthalate (PET) or other useable release substrate. Common methods of forming a thin film on a release substrate are such as coating, extruding, casting, and screen printing. The coating method can be performed by using any tools known by the skilled in the related art. The coating method can be, for example, slot die coating, spin coating, roll coating, or dip coating. Since the listed methods above are all well-known, the details are thus omitted here.

In Step 140, the acrylic resin protection film of step 130 and a polarizer film are laminated by thermolaminating to form a polarizer plate. The polarizer film can be a stretched polyvinyl alcohol (PVA) film. The temperature of the thermolamination is higher than the glass transition temperature of the acrylic resin protection film at least 10° C., such as 10° C. to 30° C.

Finally, if the glass transition temperature of the acrylic resin protection film is needed to be increased, the aging step 150 can be further performed to aging the acrylic resin protection film. However, the aging temperature could not be too high to make the PVA polarizer film shrinking. Therefore, the aging temperature is better to be 20° C. to 60° C., and the aging time is better to be at least 3 days, until the glass transition temperature variation of the acrylic resin protection film is smaller than 3° C./day. According to an embodiment, the aging temperature can be 30° C. to 50° C., or 30° C. to 40° C.

Besides, the release substrate of the step 130 can be taken off when the polarizer plate is applied to a product. In addition, the polarizer film can be sandwiched by two acrylic resin protection films or by one acrylic resin protection film and one second protection film. The second protection film can be selected from the group consisting of acrylic resin, triacetate cellulose, cycloolefin polymer, poly(methyl methacrylate), and polyethylene terephthalate Preparing Acrylic Resin for Protection Films of Polarizer Plates The acrylic resins prepared in Examples 1 and 2 were used as protection films of polarizer plates. Acrylic resins of Examples 1 and 2 were aged, and the details for the preparation of the acrylic resin are listed in Table 1. The details of the preparation include the acrylic acid monomers used properties of the acrylic resin solution, cross-linking agents and acid catalysts used.

From Table 1, it can be known that the measured glass transition temperature of the acrylic resin of Example 1 and 2 is close to the glass transition temperature calculated by the Fox Equation.

TABLE 1

The details of the preparation of the acrylic resin in Examples and the properties thereof.

| Examples | | Example 1 | Example 2 |
|---|---|---|---|
| Weight ratio of Acrylic acid monomer (Tg) | MMA[1] (106° C.) | 50 | 87 |
| | MA[2] (9° C.) | 47 | 10 |
| | 2-HEMA[3] (55° C.) | 3 | 3 |
| Solid content (wt %) | | 19.8 | 38.5 |
| Viscosity (cps) | | 316 (28.0° C.) | 34013 (24.8° C.) |
| Molecular weight | | $39.2 \times 10^4$ | $27.9 \times 10^4$ |
| Polydispersity index[4] | | 3.83 | 3.41 |
| Calculated Tg (° C.)[5] | | 51.95 | 91.75 |
| Measured Tg (° C.) before cross-linking | | 55.4 | 94.4 |
| Cross-linking agent[6] (mol/g polymer) | | $1.83 \times 10^{-4}$ | $1.83 \times 10^{-4}$ |

TABLE 1-continued

The details of the preparation of the acrylic
resin in Examples and the properties thereof.

| Examples | Example 1 | Example 2 |
|---|---|---|
| Acid catalyst[7] (mol/g polymer) | $6.17 \times 10^{-5}$ | $6.17 \times 10^{-5}$ |
| Measured Tg (° C.) after cross-linking | 73.2 | 111.5 |

[1]methyl methacrylate
[2]methyl acrylate
[3]2-hydroxyethyl methacrylate
[4]polydispersity index (PDI) = Weight-average molecular weight (Mw)/Number-average molecular weight (Mn)
[5]calculated by Fox Equation
[6]toluene diisocyanate - trimethylolpropane (TDI-TMP)
[7]aluminum acetylacetonate (Al-acac)

Measuring Optical Properties of Polarizer Plates

The acrylic resins of Examples 1 and 2 were used to prepare various thicknesses of protection film to be used to prepare various polarizer plates. The optical properties of the obtained polarizer plates were then measured to compare with the optical properties of naked polyvinyl alcohol polarizer film. The measured results are listed in Tables 2 and 3. From Tables 2 and 3, it can be known that the optical properties of the PVA polarizer film are almost the same for the polyvinyl alcohol polarizer plate with the acrylic resin protection, films. Therefore, it can be concluded that the acrylic resin protection films do not affect the optical properties of the polyvinyl alcohol polarizer films.

TABLE 2

Comparing optical properties of Example 1

| Items | PVA polarizer film | PVA plate with acrylic resin film thickness (μm)* | | |
|---|---|---|---|---|
| | | 25 | 40 | 50 |
| Transmittance (%) | 41.84 | 41.84 | 41.87 | 41.55 |
| Cross transmittance (Yc) | 0.02672 | 0.01551 | 0.01854 | 0.00395 |
| Polarization (V value) | 99.9237 | 99.9555 | 99.9469 | 99.9885 |
| Brightness (L) | 64.684 | 64.683 | 64.710 | 64.526 |
| red(+)/green(−) axial value a | −0.95 | −1.056 | −1.131 | −1.033 |
| yellow(+)/blue(−) axial value b | 0.738 | 0.995 | 1.129 | 0.679 |

*The structure of the polarizer plate was a PVA polarizer film sandwiched by two acrylic resin protection films with the same thickness.

TABLE 3

Comparing optical properties of Example 2

| Items | PVA polarizer film | PVA plate with acrylic resin protection film with a thickness of 45 μm * |
|---|---|---|
| Transmittance (%) | 43.59 | 43.59 |
| Cross transmittance (Yc) | 0.02672 | 0.05533 |
| Polarization (V value) | 99.8823 | 99.8537 |
| Brightness (L) | 66.022 | 66.023 |
| red(+)/green(−) axial value a | −0.323 | −0.384 |
| yellow(+)/blue(−) axial value b | 1.802 | 2.06 |

* The structure of the polarizer plate was a PVA polarizer film sandwiched by two acrylic resin protection films with the same thickness.

Testing Moisture Resistance of Polarizer Plates

The PVA film with acrylic resin protection films of the present polarizer were conducted a moisture resistance test. The tested structure of the polarizer plates were a PVA polarizer film sandwiched by two acrylic resin protection films with the same thickness. The tested method was immersing the polarizer plates in 50° C. water for 3 days to observe whether the acrylic resin protection film was peeled off from the PVA polarizer or PVA polarizer film was discolored.

It is obtained that the acrylic resin protection films of both Examples 1 and 2 did not peel off from the PVA polarizer film, and the PVA polarizer film did not discolor for using both Examples 1 and 2 as the protection films. Therefore, it can be known that the acrylic resin protection films can protect the PVA polarizer films from the damage of moisture.

In light of the forgoing, the acrylic resin is used to replace the conventional protection film (i.e. triacetate cellulose and cycloolefin polymer). The acrylic resin protection film is adhered to the polarizer film by thermolaminating to omit the conventional step of coating hydrogel. Therefore, applying the method above to prepare a polarizer plate can save cost and simplify the preparation process.

While the invention has been described by way of example(s) and in terms of the preferred embodiment(s) it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A preparation method of a polarizer plate, the preparation method comprising:
   preparing an acrylic resin solution having solids content of 20 wt % to 50 wt %, wherein an acrylic resin in the acrylic resin solution has a glass transition temperature higher than 50° C.;
   coating the acrylic resin solution on a release substrate to form an acrylic resin protection film; and
   laminating the acrylic resin protection film, a polarizer film, and a second protection film to form a polarizer plate, wherein the polarizer film is between the acrylic resin protection film and the second protection film.

2. The preparation method of claim 1, further comprising adding a cross-linking agent into the acrylic resin solution to cross-link the acrylic resin.

3. The preparation method of claim 1, wherein the acrylic resin protection film is formed by coating, extruding, casting, or screen printing on a release substrate.

4. The preparation method of claim 1, wherein a method of laminating the acrylic resin protection film, a polarizer film, and a second protection film is thermolaminating.

5. The preparation method of claim 1, further comprising standing the polarizer plate at 20° C. to 60° C. to increase a glass transition temperature of the acrylic resin protection film.

6. The preparation method of claim 1, wherein the polarizer film comprises a stretched polyvinyl alcohol film.

7. The preparation method of claim 1, wherein the second protection film is selected from the group consisting of acrylic resin, triacetate cellulose, cycloolefin polymer, poly (methyl methacrylate), and polyethylene terephthalate.

* * * * *